US010320682B2

(12) United States Patent
Ye (10) Patent No.: US 10,320,682 B2
(45) Date of Patent: Jun. 11, 2019

(54) MAINTAINING INFORMATION OF TE LINK (71) Applicant: HANGZHOU H3C TECHNOLOGIES CO., LTD., Zhejiang (CN)

(72) Inventor: Jinrong Ye, Beijing (CN)

(73) Assignee: Hewlett Packard Enterprise Development LP, Houston, TX (US)

(*) Notice: Subject to any disclaimer, the term of this patent is extended or adjusted under 35 U.S.C. 154(b) by 115 days.

(21) Appl. No.: 15/500,622

(22) PCT Filed: Jul. 30, 2015

(86) PCT No.: PCT/CN2015/085519
§ 371 (c)(1),
(2) Date: Jan. 31, 2017

(87) PCT Pub. No.: WO2016/015656
PCT Pub. Date: Feb. 4, 2016

(65) Prior Publication Data
US 2017/0222934 A1 Aug. 3, 2017

(30) Foreign Application Priority Data
Jul. 31, 2014 (CN) .......................... 2014 1 0371036

(51) Int. Cl.
*H04L 12/803* (2013.01)
*H04Q 11/04* (2006.01)
(Continued)

(52) U.S. Cl.
CPC ............ *H04L 47/125* (2013.01); *H04L 45/50* (2013.01); *H04L 47/82* (2013.01); *H04Q 11/04* (2013.01)

(58) Field of Classification Search
CPC ....... H04L 47/125; H04L 47/82; H04L 45/50; H04Q 11/04
See application file for complete search history.

(56) References Cited

U.S. PATENT DOCUMENTS

2002/0141345 A1* 10/2002 Szviatovszki ........... H04L 45/00
370/238
2010/0061366 A1* 3/2010 DelRegno ............... H04L 45/00
370/389

(Continued)

FOREIGN PATENT DOCUMENTS

CN 101237399 A 8/2008
CN 101729401 A 6/2010
CN 102124456 A 7/2011

OTHER PUBLICATIONS

International Search Report and Written Opinion, International Application No. PCT/CN2015/085519, dated Nov. 10, 2015, pp. 1-8, SIPO.

(Continued)

Primary Examiner — Jackie Zuniga Abad
(74) Attorney, Agent, or Firm — Nolte Intellectual Property Law Group (57) ABSTRACT A Path Computation Element (PCE) in a Multi-Protocol Label Switching (MPLS) network receives initial information of all Traffic Engineering (TE) links that is reported by a Label Switching Router (LSR), and stores the initial information into a TE database (TEDB). For the information of each TE link, the PCE determines initial values of pending bandwidth, reserved bandwidth and unreserved bandwidth of each TE-Class in the information of the TE link, and stores the initial values into the TEDB. The PCE receives a Constraint-based Routed Label Switched Path (CRLSP) calculation request from a Path Computation Client (PCC), calculates a Label Switched Path (LSP) according to the information of each TE link stored in the TEDB, and updates pending bandwidth, reserved bandwidth and unreserved bandwidth of TE-Class in the information of TE link corresponding to the LSP, wherein the information of TE link corresponding to the LSP is stored in the TEDB.

14 Claims, 4 Drawing Sheets (51) Int. Cl.
  *H04L 12/723* (2013.01)
  *H04L 12/911* (2013.01)

(56) References Cited

U.S. PATENT DOCUMENTS

2013/0254195 A1   9/2013   Chen
2014/0205288 A1   7/2014   Alvarez

OTHER PUBLICATIONS

Chen et al., "Network Resource Distribution Scheme Based on Traffic Engineering and Policy Mechanism," Communications Technology, Dec. 31, 2009, pp. 141-146, No. 11, vol. 42., People's Republic of China, Machine English Translation: pp. 1-11.
English Abstract on "Research and simulation on traffic engineering based on DiffServ over MPLS", Nov. 15, 2007, 87 pages.

* cited by examiner

FIG. 5

MAINTAINING INFORMATION OF TE LINK

BACKGROUND

Traffic Engineering (TE) may solve a congestion problem caused by load imbalance. The TE may dynamically adjust traffic management parameters, routing parameters and resource constraint parameters through monitoring network traffic and load of network elements in real time. Accordingly, a desired network running state may be achieved, network resources may be optimized and the congestion problem caused by load imbalance may be avoided.

Multi-Protocol Label Switching (MPLS) TE combines a MPLS technology with the TE, and performs resource reservation through a Constraint-based Routed Label Switched Path (CRLSP). In this way, network traffic may bypass congested nodes so as to be balanced. The establishment of a CRLSP not only depends on routing information, but also satisfies other constraint conditions such as bandwidth and an explicit path.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Path calculation in MPLS TE may include three parts.

1) Path Computation Element (PCE)

The PCE is a module for calculating a constraint-based path based on a TE database (TEDB). In an example, the PCE may be a component or an application, and may be located on a Label Switching Router (LSR) or a server. When each LSR in a MPLS network starts or, a link state or property in a Link State DataBase (LSDB) of each LSR changes, the LSR reports information of TE link to the PCE, and the PCE establishes a TEDB according to the information of TE link. For example, when each LSR in the MPLS network starts or, a link state or property in a LSDB of each LSR changes, the LSR sends information of its TE link to a designated LSR. The designated LSR may report collected information of TE links of all LSRs to the PCE through a Border Gateway Protocol-Link State (BGP-LS). The information of each TE link that is reported by the designated LSR may include a LSR identity, a link identity, an IP address of local interface of the TE link, an IP address of adjacent interface of the TE link, Maximum Reservable Bandwidth (MRB) of the TE link, a TE measurement value of the TE link, and unreserved bandwidth of each TE-Class of the TE link.

2) Path Computation Client (PCC)

The PCC sends a CRLSP calculation request to the PCE, and receives a CRLSP calculation response from the PCE. The PCC may be located on a LSR or a management station. When receiving one or more Label Switched Path (LSP) parameters from the PCE, the PCC may initiate or reinitiate a CRLSP signaling procedure, for instance, Resource reSerVation Protocol-Traffic Engineering (RSVP-TE) establishes or updates a CRLSP signaling procedure.

3) PCC-PCE Communication Protocol (PCEP)

If two entities such as the PCC and the PCE or two PCEs are not located on the same LSR or server when communicating, the two entities may communicate according to the PCEP.

Figure 1:
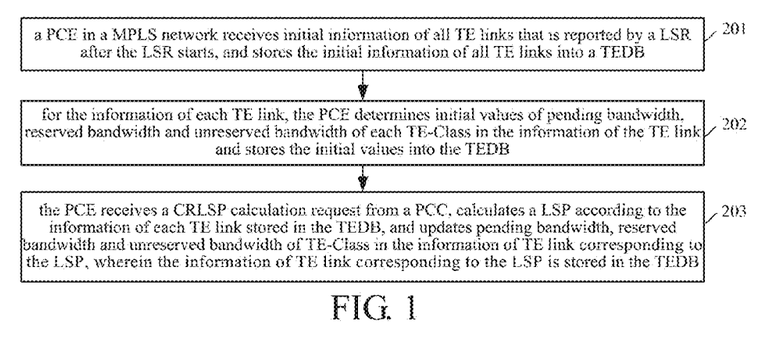
FIG. 1 is a flowchart illustrating a method for maintaining information of TE link according to an example of the present disclosure.

FIG. 1 is a flowchart illustrating a method for maintaining information of TE link according to an example of the present disclosure. The method includes following blocks.

At block 201, a PCE in a MPLS network receives initial information of all TE links that is reported by a LSR after the LSR starts, and stores the initial information of all TE links into a TEDB.

At block 202, for the information of each TE link, the PCE determines initial values of pending bandwidth, reserved bandwidth and unreserved bandwidth of each TE-Class in the information of the TE link and stores the initial values into the TEDB.

At block 203, the PCE receives a CRLSP calculation request from a PCC, calculates a LSP according to the information of each TE link stored in the TEDB, and updates pending bandwidth, reserved bandwidth and unreserved bandwidth of TE-Class in the information of TE link corresponding to the LSP, wherein the information of TE link corresponding to the LSP is stored in the TEDB.

The initial information of each TE link at block 201 may include:

1) a LSR identity,
2) a link identity,
3) an IP address of local interface of the TE link,
4) an IP address of adjacent interface of the TE link,
5) MRB of the TE link,
6) a TE measurement value of the TE link, and
7) MRB of each Class Type (CT) of the TE link.

In an example, the PCE in the MPLS network receiving the initial information of all TE links that is reported by the LSR after the LSR starts may be implemented through a following method.

The PCE receives the initial information of each TE link of each LSR that is reported by the LSR after the LSR starts, and stores the information of each TE link into the TEDB. The initial information of each TE link includes a LSR identity, a link identity, an IP address of local interface of the TE link, an IP address of adjacent interface of the TE link, MRB of the TE link. MRB of each CT of the TE link and a TE measurement value of the TE link.

In another example, the PCE in the MPLS network receiving the initial information of all TE links that is reported by the LSR after the LSR starts may be implemented through a following method.

The PCE receives the information of all TE links of all LSRs that is reported by a designated LSR through BGP-LS. The information of each TE link includes a LSR identity, a link identity, an IP address of local interface of the TE link, an IP address of adjacent interface of the TE link. MRB of the TE link. MRB of each CT of the TE link, a TE measurement value of the TE link, and an initial value of unreserved bandwidth of each TE-Class of the TE link. Though the designated LSR reports the initial value of unreserved bandwidth of each TE-Class, the PCE still calculates the initial value of unreserved bandwidth of each TE-Class at block 202 or the PCE initializes the unreserved bandwidth of each TE-Class to MRB of the CT corresponding to the TE-Class.

When any content in the information of any TE link that is reported by any LSR changes, the LSR reports an updated value of the content to the PCE. According to the update value, the PCE updates content in the stored information of the TE link of the LSR. The updated content in the information of the TE link may include one or any combination of the following:

an IP address of local interface of the TE link,
an IP address of adjacent interface of the TE link,
MRB of the TE link,
a TE measurement value of the TE link, and
MRB of each CT of the TE link.

In an example, block 202 may be implemented as follows.

The PCE initializes the pending bandwidth and reserved bandwidth of each TE-Class in the information of the TE link to 0. The PCE calculates the initial value of unreserved bandwidth of each TE-Class in the information of the TE link according to a predefined bandwidth reservation model, the initial value of reserved bandwidth of each TE-Class in the information of the TE link, MRB of the TE link and MRB of each CT in the initial information of the TE link that is reported by the LSR.

The PCE stores the initial values of the pending bandwidth, reserved bandwidth and unreserved bandwidth of each TE-Class in the information of the TE link into the TEDB.

In another example, at block 202, the PCE initializes the unreserved bandwidth of each TE-Class to the MRB of the CT corresponding to the TE-Class rather than calculate the initial value of unreserved bandwidth of each TE-Class.

The unreserved bandwidth is bandwidth having not been reserved.

After block 202, the information of the TE link stored in the TEDB may include the following:

1) a LSR identity,
2) a link identity,
3) an IP address of local interface of the TE link,
4) an IP address of adjacent interface of the TE link,
5) MRB of the TE link,
6) a TE measurement value of the TE link,
7) MRB of each CT of the TE link,
8) pending bandwidth of each TE-Class of the TE link,
9) reserved bandwidth of each TE-Class of the TE link, and
10) unreserved bandwidth of each TE-Class of the TE link.

In an example, the PCE receiving the CRLSP calculation request from the PCC and calculating the LSP according to the information of each TE link stored in the TEDB includes the following.

The PCE receives the CRLSP calculation request containing a LSP identity and a LSP constraint condition from the PCC. The PCE calculates a LSP satisfying the LSP identity and the LSP constraint condition according to the information of each TE link stored in the TEDB. If calculation is successful, the PCE returns information of the LSP to the PCC. The LSP constraint condition includes a TE-Class identity and bandwidth required by the LSP.

The PCE updating the pending bandwidth, reserved bandwidth and unreserved bandwidth of the TE-Class in the information of the TE link corresponding to the LSP includes the following.

After calculating the LSP, the PCE updates the pending bandwidth of the TE-Class in the information of each TE link corresponding to the LSP according to the bandwidth required by the LSP. The PCE updates the unreserved bandwidth of the TE-Class in the information of each TE link corresponding to the LSP according to the predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth. Herein, the information of each TE link corresponding to the LSP is stored in the TEDB.

The information of each TE link corresponding to the LSP refers to information of each TE link of each LSR located on the LSP, Which is stored in the TEDB.

When the PCE receives a LSP establishment success report from the PCC, for the information of each TE link corresponding to the LSP, the PCE subtracts the bandwidth required by the LSP from the pending bandwidth of the TE-Class in the information of the TE link stored in the TEDB, and adds the bandwidth required by the LSP to the reserved bandwidth of the TE-Class in the information of the TE link stored in the TEDB.

When the PCE does not receive a LSP establishment success report from the PCC, for the information of each TE link corresponding to the LSP, the PCE subtracts the bandwidth required by the LSP from the pending bandwidth of the TE-Class in the information of the TE link stored in the TEDB, and updates the unreserved bandwidth of the TE-Class in the information of the TE link stored in the TEDB according to the predefined bandwidth reservation model, the NLRB of the TE link and the MRB of CT corresponding to the TE-Class in the initial information of the TE link that is reported by the LSR and by taking the pending bandwidth of the TE-Class in the information of the TE link as the reserved bandwidth.

Figure 2:
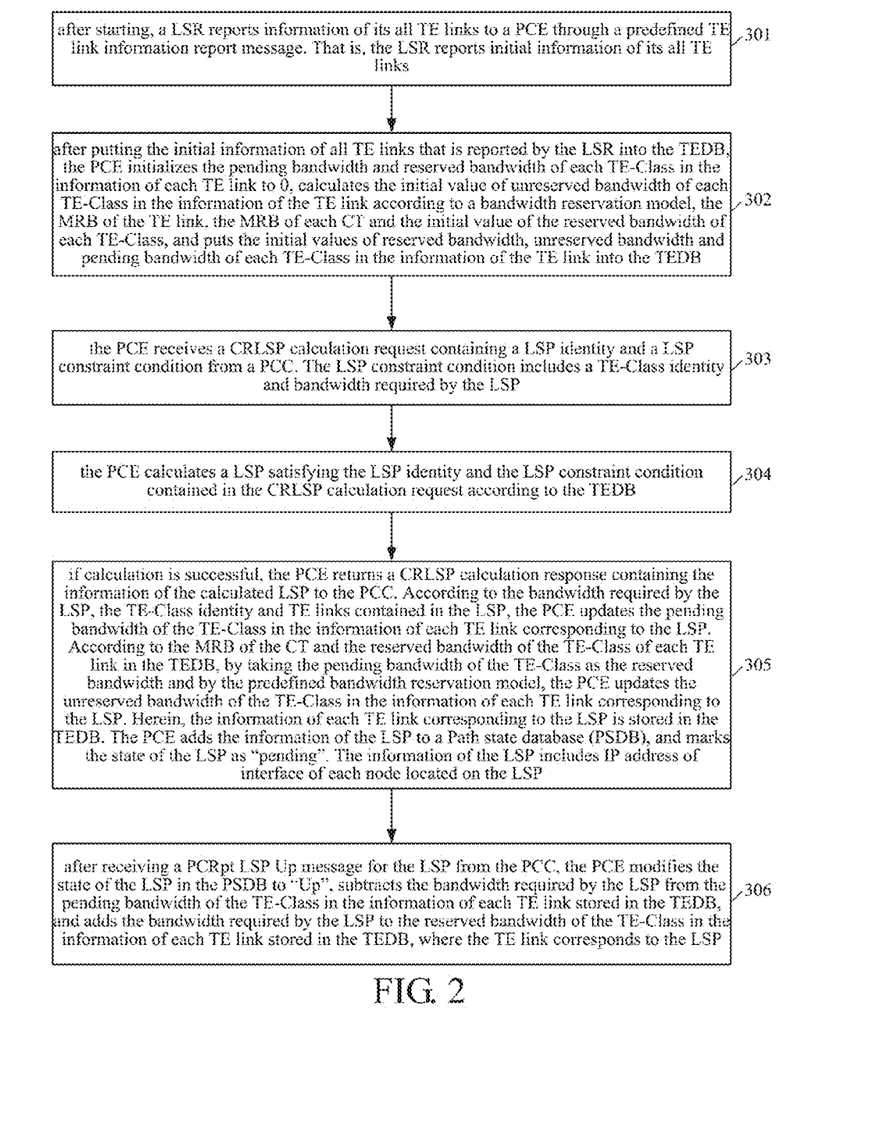
FIG. 2 is a flowchart illustrating a method for maintaining information of TE link according to another example of the present disclosure.

FIG. 2 is a flowchart illustrating a method for maintaining information of TE link according to another example of the present disclosure. The method includes blocks 301 to 306.

At block 301, after starting, a LSR reports information of its all TE links to a PCE through a predefined TE link information report message. That is, the LSR reports initial information of its all TE links.

The TE link information report message may be used to report the information of TE link to the PCE by the LSR.

The information of each TE link that is reported to the PCE by the LSR may include:

1) a LSR identity,
2) a link identity,
3) an IP address of local interface of the TE link, 4) an IP address of adjacent interface of the TE link,
5) NLRB of the TE link,
6) a TE measurement value of the TE link,
7) NLRB of each CT of the TE link, When any content in the information of TE link that is reported by the LSR is updated, the LSR reports an update value of the content to the PCE. After receiving the update value, the PCE determines, according to an actual condition, whether to update the information of the TE link that is maintained by it. For example, the MRB of a CT of a TE link of a LSR is increased from 100M to 200M, five LSPs have been established for one of TE-Classes corresponding to the CT, reserved bandwidth is 75M, and thus unreserved bandwidth of the TE-Class is updated to 200M−75M=125M from initial unreserved bandwidth 100M−75M=25M. When the MRB of a CT of a TE link of a LSR is decreased, the PCE may perform processing according to an actual condition. For example, in order to ensure normal communication of an established LSP, the PCE may not adjust the unreserved bandwidth of the TE-Class, or may remove part of LSPs corresponding to the CT, or may prescribe in advance that it is unallowable to decrease the MRB.

At block 302, after putting the initial information of all TE links that is reported by the LSR into the TEDB, the PCE initializes the pending bandwidth and reserved bandwidth of each TE-Class in the information of each TE link to 0, calculates the initial value of unreserved bandwidth of each TE-Class in the information of the TE link according to a bandwidth reservation model, the MRB of the TE link, the MRB of each CT and the initial value of the reserved bandwidth of each TE-Class, and puts the initial values of reserved bandwidth, unreserved bandwidth and pending bandwidth of each TE-Class in the information of the TE link into the TEDB.

The information of each TE link that is maintained in the TEDB may include:
1) a LSR identity,
2) a link identity,
3) an IP address of local interface of the TE link,
4) an IP address of adjacent interface of the TE link,
5) MRB of the TE link,
6) MRB of each CT of the TE link,
7) reserved bandwidth of each TE-Class of the TE link,
8) pending bandwidth of each TE-Class of the TE link,
9) unreserved bandwidth of each TE-Class of the TE link, and
10) a TE measurement value of the TE link.

At block 303, the PCE receives a CRLSP calculation request containing a LSP identity and a LSP constraint condition from a PCC. The LSP constraint condition includes a TE-Class identity and bandwidth required by the LSP.

The TE-Class identity includes a CT and a priority.

At block 304, the PCE calculates a LSP satisfying the LSP identity and the LSP constraint condition contained in the CRLSP calculation request according to the TEDB.

At block 305, if calculation is successful, the PCE returns a CRLSP calculation response containing the information of the calculated LSP to the FCC. According to the bandwidth required by the LSP, the TE-Class identity and TE links contained in the LSP, the PCE updates the pending bandwidth of the TE-Class in the information of each TE link corresponding to the LSP. According to the MRB of the CT and the reserved bandwidth of the TE-Class of each TE link in the TEDB, by taking the pending bandwidth of the TE-Class as the reserved bandwidth and by the predefined bandwidth reservation model, the PCE updates the unreserved bandwidth of the TE-Class in the information of each TE link corresponding to the LSP. Herein, the information of each TE link corresponding to the LSP is stored in the TEDB. The PCE adds the information of the LSP to a Path state database (PSDB), and marks the state of the LSP as "pending". The information of the LSP includes IP address of interface of each node located on the LSP.

When updating the pending bandwidth of the TE-Class in the information of each TE link corresponding to the LSP, the PCE adds the bandwidth required by the LSP to the pending bandwidth of the TE-Class in the information of the TE link.

When calculating the unreserved bandwidth of the TE-Class in the information of each TE link corresponding to the LSP, the pending bandwidth of the TE-Class in the information of each TE link participates in the calculation as the reserved bandwidth.

Figure 3:
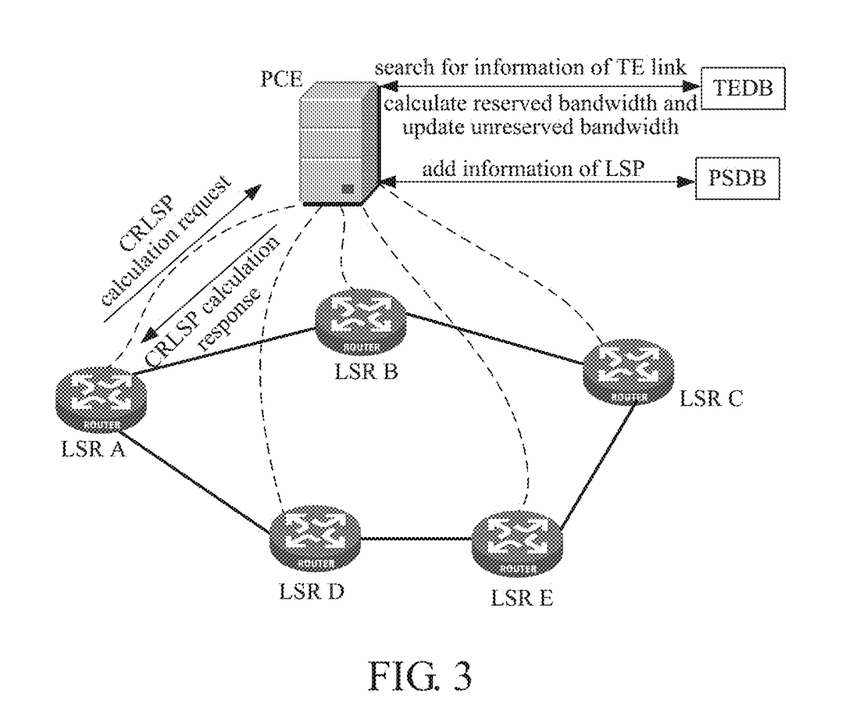
FIG. 3 is a diagram illustrating a network structure according to an example of the present disclosure.

As shown in FIG. 3, suppose LSR A is the PCC, which sends a CRLSP calculation request to the PCE. A head node of the requested LSP is LSR A, a tail node is LSR E, a TE-Class identity is m, and the required bandwidth is 50M.

A LSP calculated by the PCE according to the TEDB is LSR. A-LSR D-LSR E, and the PCE performs the following.

a) The PCE returns a CRLSP calculation response containing the information of the LSP. The information of the LSP includes IP addresses of interfaces of LSR A, LSR D, LSR E located on the LSP.

b) The PCE searches the TEDB for the information of TE links respectively according to the IP addresses of interfaces of LSR A and LSR D and according to the IP addresses of interfaces of LSR D and LSR E, and adds 50M to the pending bandwidth of TE-Class m in the found information of each TE link. By taking the pending bandwidth of TE-Class m in the information of each TE link as the reserved bandwidth, the PCE updates the unreserved bandwidth of TE-Class m in the information of each TE link according to the bandwidth reservation model.

c) The PCE adds the information of the LSP into the PSDB, and sets the state of the LSP as "pending".

At block 306, after receiving a PCRpt LSP Up message for the LSP from the PCC, the PCE modifies the state of the LSP in the PSDB to "Up", subtracts the bandwidth required by the LSP from the pending bandwidth of the TE-Class in the information of each TE link stored in the TEDB, and adds the bandwidth required by the LSP to the reserved bandwidth of the TE-Class in the information of each TE link stored in the TEDB, where the TE link corresponds to the LSP.

In an example, during the establishment of the LSP, if the PCC finds that idle bandwidth of current TE link is lower than the bandwidth required by the LSP, the PCC may occupy bandwidth of another LSP with a low priority. That is, the PCC may remove the LSP with a low priority and occupy the bandwidth of the LSP with a low priority. The PCRpt LSP Up message sent to the PCE by the PCC contains an identity of the LSP whose bandwidth is occupied, which is called an identity of a first LSP. Accordingly, besides updating the information of TE link corresponding to the established LSP, the PCE updates the information of TE link corresponding to the first LSP whose bandwidth is occupied.

The PCE subtracts the bandwidth occupied by the first LSP from the reserved bandwidth of the TE-Class in the information of each TE link corresponding to the first LSP. The PCE updates the unreserved bandwidth of the TE-Class in the information of each TE link corresponding to the first LSP according to the predefined bandwidth reservation model, the MRB of the TE link and the MRB of CT corresponding to the TE-Class in the initial information of the TE link that is reported by the LSP and by taking the pending bandwidth of the TE-Class in the information of the TE link as the reserved bandwidth. Herein, the information of each TE link corresponding to the first LSP is stored in the TEDB.

If the PCE receives a PCRpt LSP Down message from the PCC, or does not receive a PCRpt LSP Up message from the PCC within a predefined waiting period, the PCE deletes the information of the LSP from the PSDB, restores the pending bandwidth and unreserved bandwidth of the TE-Class in the information of each TE link corresponding to the LSP. In an example, the PCE subtracts the bandwidth required by the LSP from the pending bandwidth of the TE-Class in the information of each TE link corresponding to the LSP. The PCE updates the unreserved bandwidth of the TE-Class in the information of each TE link corresponding to the LSP according to the MRB of CT corresponding to the TE-Class and the reserved bandwidth of the TE-Class in the information of each TE link corresponding to the LSP, by taking the pending bandwidth of the TE-Class as the reserved bandwidth and by the predefined bandwidth reservation model. Herein, the information of each TE link corresponding to the LSP is stored in the TEDB.

In another example, blocks 301 to 302 may be replaced with the following solutions.

At block 301, the LSR in the MPLS network reports the information of its all TE links to a designated LSR after starting, and the designated LSP reports the collected information of TE links of all LSRs to the PCE.

The information of each TE link that is reported to the designated LSR by the LSR includes a LSR identity, a link identity, an IP address of local interface of the TE link, an IP address of adjacent interface of the TE link, initial values of MRB of the TE link, MRB of each CT of the TE link, and unreserved bandwidth of each TE-Class of the TE link, and a TE measurement value of the TE link.

At block 302, the PCE puts the information of all TE links that is reported by the designated LSR into a first TEDB, copies the first TEDB and deletes the initial value of unreserved bandwidth of each TE-Class in the information of each TE link stored in the copied first TEDB to obtain a second TEDB. The PCE initializes the pending bandwidth of each TE-Class in the information of each TE link stored in the second TEDB to 0. The PCE calculates the initial value of unreserved bandwidth of each TE-Class in the information of the TE link according to the MRB of each CT of the TE link, the initial value of reserved bandwidth of each TE-Class and the bandwidth reservation model, and put the initial values of unreserved bandwidth and pending bandwidth of each TE-Class in the information of each TE link into the second TEDB.

And thus, the information of each TE link that is maintained in the second TEDB is the same as that in the TEDB described at block 302.

The TEDB described at blocks 304 to 306 refers to the second TEDB.

Figure 4:
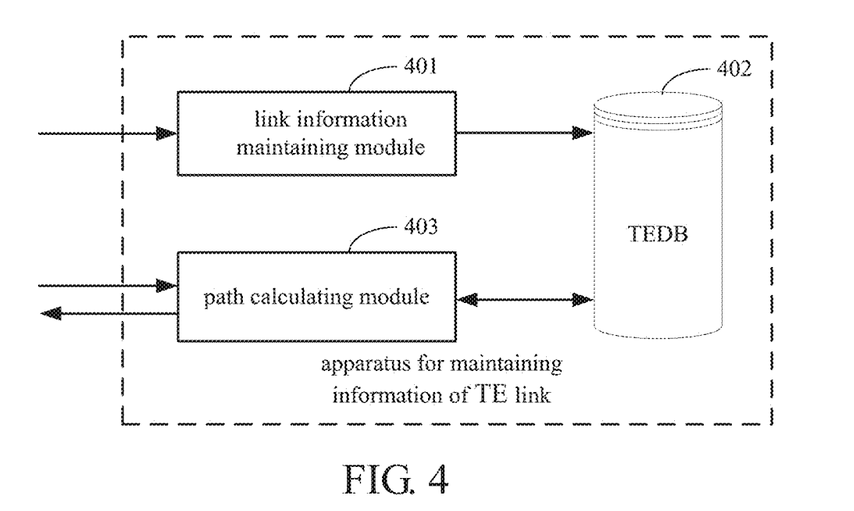
FIG. 4 is a diagram illustrating a structure of an apparatus for maintaining information of TE link according to an example of the present disclosure.

FIG. 4 is a diagram illustrating a structure of an apparatus for maintaining information of TE link according to an example of the present disclosure. The apparatus is located on the PCE in the MPLS network, and includes a link information maintaining module 401, a TEDB 402 and a path calculating module 403.

The link information maintaining module 401 may receive initial information of all TE links that is reported by a LSR after the LSR starts, and store the information of all TE links into the TEDB 402. For the information of each TE link, the link information maintaining module 401 may determine initial values of pending bandwidth, reserved bandwidth and unreserved bandwidth of each TE-Class in the information of the TE link and stores the initial values into the TEDB 402.

The TEDB 402 may store the information of all TE links.

The path calculating module 403 may receive a CRISP calculation request from a PCC, calculate a LSP according to the information of each TE link stored in the TEDB 402, and update the pending bandwidth, reserved bandwidth and unreserved bandwidth of TE-Class in the information of TE link corresponding to the LSP, wherein the information of TE link corresponding to the LSP is stored in the TEDB 402.

The link information maintaining module 401 may initialize the pending bandwidth and reserved bandwidth of each TE-Class in the information of the TE link to 0, and calculate an initial value of unreserved bandwidth of each TE-Class in the information of the TE link according to a predefined bandwidth reservation model, the initial value of reserved bandwidth of each TE-Class in the information of the TE link, the MRB of the TE link and the MRB of each CT in the initial information of the TE link that is reported by the LSR. The link information maintaining module 401 may store the initial values of the pending bandwidth, reserved bandwidth and unreserved bandwidth of each TE-Class in the information of the TE link into the TEDB 402.

The initial information of all TE links that is reported to the link information maintaining module 401 by the LSR includes: a LSR identity, a link identity, an IP address of local interface of each TE link, an IP address of adjacent interface of each TE link, MRB of each TE link, a TE measurement value of each TE link, and MRB of each CT of each TE link. The link information maintaining module 401 may further receive updated content of information of any TE link of the LSR, and update content in the information of the TE link stored in the TEDB 402 according to the updated content. The updated content in the information of the TE link includes one or any combination of the following: an IP address of local interface of the TE link, an IP address of adjacent interface of the TE link, MRB of the TE link, a TE measurement value of the TE link, and MRB of each CT of the TE link.

The path calculating module 403 may receive a CRISP calculation request containing a LSP identity and a LSP constraint condition from the PCC, calculates a LSP satisfying the LSP identity and the LSP constraint condition according to the information of each TE link stored in the TEDB 402. The LSP constraint condition includes a TE-Class identity and bandwidth required by the LSP. If calculation is successful, the path calculating module 403 may return the information of the LSP to the PCC.

After calculating the LSP, the path calculating module 403 may update the pending bandwidth of the TE-Class in the information of each TE link corresponding to the LSP according to the bandwidth required by the LSP, where the information of each TE link corresponding to the LSP is stored in the TEDB 402. For the information of each TE link corresponding to the LSP, the path calculating module 403 may update the unreserved bandwidth of the TE-Class in the information of the TE link stored in the TEDB 402 according to the predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth.

After updating the unreserved bandwidth of the TE-Class in the information of the TE link stored in the TEDB 402 and when receiving a LSP establishment success report from the PCC, for the information of each TE link corresponding to the LSP, the path calculating module 403 may subtract the bandwidth required by the LSP from the pending bandwidth of the TE-Class in the information of the TE link stored in the TEDB 402, and add the bandwidth required by the LSP to the reserved bandwidth of the TE-Class in the information of the TE link stored in the TEDB 402.

When the LSP establishment success report contains an identity of a first LSP whose bandwidth is occupied, for the information of each TE link corresponding to the first LSP, the path calculating module 403 may subtract the bandwidth occupied by the first LSP from the reserved bandwidth of the TE-Class in the information of the TE link stored in the TEDB 402, and update the unreserved bandwidth of the TE-Class in the information of the TE link stored in the TEDB 402 according to the predefined bandwidth reservation model, the MRB of the TE link and the MRB of CT corresponding to the TE-Class in the initial information of the TE link that is reported by the first LSP and by taking the pending bandwidth of the TE-Class in the information of the TE link as the reserved bandwidth, where the TE link corresponds to the first LSP.

After updating the unreserved bandwidth of the TE-Class in the information of the TE link stored in the TEDB 402 and when the path calculating module 403 does not receive the LSP establishment success report from the PCC, for the information of each TE link corresponding to the LSP, the path calculating module 403 may subtract the bandwidth required by the LSP from the pending bandwidth of the TE-Class in the information of the TE link stored in the TEDB 402, and update the unreserved bandwidth of the TE-Class in the information of the TE link stored in the TEDB 402 according to the predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth.

Figure 5:
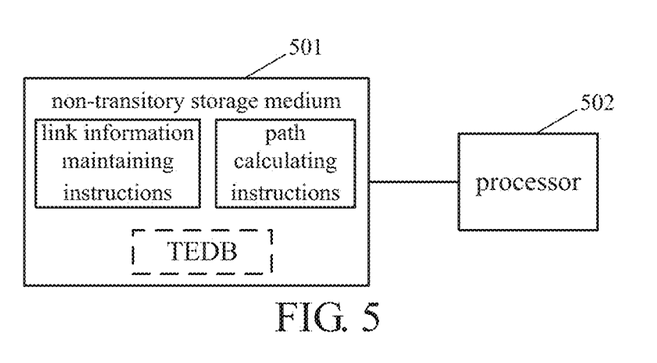
FIG. 5 is a diagram illustrating a hardware structure of an apparatus for maintaining information of TE link according to an example of the present disclosure.

The apparatus for maintaining information of TE link may be a programmable device combining software with hardware, referring to FIG. 5. FIG. 5 is a diagram illustrating a hardware structure of an apparatus for maintaining information of TE link according to an example of the present disclosure. The apparatus for maintaining information of TE link includes a non-transitory storage medium 501 and a processor 502 such as a CPU.

The non-transitory storage medium 501 may store machine readable instructions, including link information maintaining instructions and path calculating instructions that can be executed by the processor 502.

The processor 502 may read the link information maintaining instructions and the path calculating instructions stored in the non-transitory storage medium 501 to implement the functions of the link information maintaining module and the path calculating module shown in FIG. 4.

A TEDB may be set in the non-transitory storage medium 501 or set separately to store information of TE link.

The apparatus shown in FIG. 5 is one of examples. The apparatus may also be implemented through a structure different from that described in the above example. For example, some or all of the above may be implemented by Application Specific Integrated Circuits (ASIC) or FPGA instead of by machine readable instructions executed by a CPU. Further, there may be one or more CPUs. If there are more CPUs, the CPUs may read and execute the machine readable instructions together.

In the examples of the present disclosure, the PCE may maintain the pending bandwidth, reserved bandwidth and unreserved bandwidth of the TE link according to the establishment condition of the LSP, thereby ensuring the accuracy of the bandwidth of the TE link maintained by the PCE and further improving a probability that the LSP is established successfully.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for maintaining information of Traffic Engineering (TE) link, comprising:
  receiving, by a Path Computation Element (PCE) in a Multi-Protocol Label Switching (MPLS) network, initial information of all TE links that is reported by a Label Switching Router (LSR) after the LSR starts, and storing the initial information into a TE database (TEDB);
  for the information of each TE link, determining, by the PCE, initial values of pending bandwidth, reserved bandwidth and unreserved bandwidth of each TE-Class in the information of the TE link, and storing the initial values into the TEDB; and
  receiving, by the PCE, a Constraint-based Routed Label Switched Path (CRLSP) calculation request from a Path Computation Client (PCC), calculating a Label Switched Path (LSP) according to the information of each TE link stored in the TEDB, and updating pending bandwidth, reserved bandwidth and unreserved bandwidth of TE-Class in the information of TE link corresponding to the LSP, wherein the information of TE link corresponding to the LSP is stored in the TEDB,
  wherein determining, by the PCE, the initial values of pending bandwidth, reserved bandwidth and unreserved bandwidth of each TE-Class in the information of the TE link and storing the initial values into the TEDB comprises initializing, by the PCE, the pending bandwidth and reserved bandwidth of each TE-Class in the information of the TE link to 0.

2. The method of claim 1, wherein determining, by the PCE, the initial values of pending bandwidth, reserved bandwidth and unreserved bandwidth of each TE-Class in the information of the TE link and stores the initial values into the TEDB further comprises:
  calculating the initial value of unreserved bandwidth of each TE-Class in the information of the TE link according to a predefined bandwidth reservation model, the initial value of reserved bandwidth of each TE-Class in the information of the TE link, Maximum Reservable Bandwidth (MRB) of the TE link and MRB of each Class Type (CT) in the initial information of the TE link that is reported by the LSR; and storing, by the PCE, the initial values of the pending bandwidth, reserved bandwidth and unreserved bandwidth of each TE-Class in the information of the TE link into the TEDB.

3. The method of claim 1, wherein the initial information of each TE link comprises a LSR identity, a link identity, an IP address of local interface of the TE link, an IP address of adjacent interface of the TE link, MRB of the TE link, a TE measurement value of the TE link, and MRB of each TE-Class of the TE link;
after the PCE receives the initial information of all TE links that is reported by the LSR, the method further comprises:
receiving updated content of information of any TE link of the LSR, and updating content in the information of the TE link stored in the TEDB according to the received updated content; the updated content of the information of the TE link comprises one or any combination of:
an IP address of local interface of the TE link, an IP address of adjacent interface of the TE link, MRB of the TE link, a TE measurement value of the TE link, and MRB of each CT of the TE link.

4. The method of claim 1, wherein receiving, by the PCE, the CRLSP calculation request from the PCC and calculating the LSP according to the information of each TE link stored in the TEDB comprises:
receiving, by the PCE, the CRLSP calculation request containing a LSP identity and a LSP constraint condition from the PCC, and calculating the LSP satisfying the LSP identity and the LSP constraint condition according to the information of each TE link stored in the TEDB, wherein the LSP constraint condition comprises a TE-Class identity and bandwidth required by the LSP; returning, by the PCE, information of the LSP to the PCC when the calculation is successful; and
updating the pending bandwidth, reserved bandwidth and unreserved bandwidth of the TE-Class in the information of the TE link corresponding to the LSP comprises:
after calculating the LSP, updating, by the PCE, the pending bandwidth of the TE-Class in the information of each TE link corresponding to the LSP according to the bandwidth required by the LSP, and updating the unreserved bandwidth of the TE-Class in the information of each TE link corresponding to the LSP according to a predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth, wherein the information of each TE link corresponding to the LSP is located in the TEDB.

5. The method of claim 4, after updating the unreserved bandwidth of the TE-Class in the information of the TE link stored in the TEDB, further comprising:
when receiving a LSP establishment success report from the PCC, for the information of each TE link corresponding to the LSP, subtracting, by the PCE, the bandwidth required by the LSP from the pending bandwidth of the TE-Class in the information of the TE link stored in the TEDB, and adding the bandwidth required by the LSP to the reserved bandwidth of the TE-Class in the information of the TE link stored in the TEDB.

6. The method of claim 5, when the LSP establishment success report contains an identity of a first LSP whose bandwidth is occupied and after the PCE receives the LSP establishment success report from the PCC, further comprising:
subtracting, by the PCE, bandwidth occupied by the first LSP from the reserved bandwidth of the TE-Class in the information of each TE link corresponding to the first LSP, and updating the unreserved bandwidth of the TE-Class in the information of the TE link corresponding to the first LSP according to the predefined bandwidth reservation model, the MRB of each TE link corresponding to the first LSP and the MRB of CT corresponding to the TE-Class in the initial information of the TE link that is reported by the LSP and by taking the pending bandwidth of the TE-Class in the information of the TE link corresponding to the first LSP as the reserved bandwidth, wherein the information of each TE link corresponding to the first LSP is stored in the TEDB.

7. The method of claim 4, after updating the unreserved bandwidth of the TE-Class in the information of the TE link stored in the TEDB, further comprising:
when the PCE does not receive a LSP establishment success report from the PCC, for the information of each TE link corresponding to the LSP, subtracting, by the PCE, the bandwidth required by the LSP from the pending bandwidth of the TE-Class in the information of the TE link stored in the TEDB, and updating the unreserved bandwidth of the TE-Class in the information of the TE link stored in the TEDB according to the predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth.

8. An apparatus for maintaining information of Traffic Engineering (TE) link, located on a Path Computation Element (PCE) in a Multi-Protocol Label Switching (MPLS) network, comprising:
a link information maintaining module, to receive initial information of all TE links that is reported by a Label Switching Router (LSR) after the LSR starts, and store the initial information into a TE database (TEDB); for the information of each TE link, to determine initial values of pending bandwidth, reserved bandwidth and unreserved bandwidth of each TE-Class in the information of the TE link, and store the initial values into the TEDB; and
a path calculating module, to receive a Constraint-based Routed Label Switched Path (CRLSP) calculation request from a Path Computation Client (PCC), calculate a Label Switched Path (LSP) according to the information of each TE link stored in the TEDB, and update pending bandwidth, reserved bandwidth and unreserved bandwidth of TE-Class in the information of TE link corresponding to the LSP, wherein the information of TE link corresponding to the LSP is stored in the TEDB,
wherein the link information maintaining module is to further initialize the pending bandwidth and reserved bandwidth of each TE-Class in the information of the TE link to 0.

9. The apparatus of claim 8, wherein the link information maintaining module is to calculate the initial value of unreserved bandwidth of each TE-Class in the information of the TE link according to a predefined bandwidth reservation model, the initial value of reserved bandwidth of each TE-Class in the information of the TE link, Maximum Reservable Bandwidth (MRB) of the TE link and MRB of each Class Type (CT) in the initial information of the TE link that is reported by the LSR; and to store the initial values of the pending bandwidth, reserved bandwidth and unreserved bandwidth of each TE-Class in the information of the TE link into the TEDB.

10. The apparatus of claim 8, wherein the initial information of each TE link comprises a LSR identity, a link identity, an IP address of local interface of the TE link, an IP address of adjacent interface of the TE link, MRB of the TE link, a TE measurement value of the TE link, and MRB of each TE-Class of the TE link; and the link information maintaining module is to receive updated content of information of any TE link of the LSR, and update content in the information of the TE link stored in the TEDB according to the received updated content; the updated content of the information of the TE link comprises one or any combination of: an IP address of local interface of the TE link, an IP address of adjacent interface of the TE link, MRB of the TE link, a TE measurement value of the TE link, and MRB of each CT of the TE link.

11. The apparatus of claim 8, wherein the path calculating module is to receive the CRLSP calculation request containing a LSP identity and a LSP constraint condition from the PCC, and calculate the LSP satisfying the LSP identity and the LSP constraint condition according to the information of each TE link stored in the TEDB, wherein the LSP constraint condition comprises a TE-Class identity and bandwidth required by the LSP; return information of the LSP to the PCC when the calculation is successful; and to update, after calculating the LSP, the pending bandwidth of the TE-Class in the information of each TE link corresponding to the LSP according to the bandwidth required by the LSP, and update the unreserved bandwidth of the TE-Class in the information of each TE link corresponding to the LSP according to a predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth, wherein the information of each TE link corresponding to the LSP is located in the TEDB.

12. The apparatus of claim 11, wherein the path calculating module is to, when receiving a LSP establishment success report from the PCC, for the information of each TE link corresponding to the LSP, subtract the bandwidth required by the LSP from the pending bandwidth of the TE-Class in the information of the TE link stored in the TEDB, and add the bandwidth required by the LSP to the reserved bandwidth of the TE-Class in the information of the TE link stored in the TEDB.

13. The apparatus of claim 12, wherein the path calculating module is further to, when the LSP establishment success report contains an identity of a first LSP whose bandwidth is occupied, subtract bandwidth occupied by the first LSP from the reserved bandwidth of the TE-Class in the information of each TE link corresponding to the first LSP, and update the unreserved bandwidth of the TE-Class in the information of the TE link corresponding to the first LSP according to the predefined bandwidth reservation model, the MRB of each TE link corresponding to the first LSP and the MRB of CT corresponding to the TE-Class in the initial information of the TE link that is reported by the LSP and by taking the pending bandwidth of the TE-Class in the information of the TE link corresponding to the first LSP as the reserved bandwidth, wherein the information of each TE link corresponding to the first LSP is stored in the TEDB.

14. The apparatus of claim 11, wherein the path calculating module is further to, after updating the unreserved bandwidth of the TE-Class in the information of the TE link stored in the TEDB, when the PCE does not receive a LSP establishment success report from the PCC, for the information of each TE link corresponding to the LSP, subtract the bandwidth required by the LSP from the pending bandwidth of the TE-Class in the information of the TE link stored in the TEDB, and update the unreserved bandwidth of the TE-Class in the information of the TE link stored in the TEDB according to the predefined bandwidth reservation model, the MRB of the TE link and the MRB of CT corresponding to the TE-Class in the initial information of the TE link that is reported by the LSR and by taking the pending bandwidth of the TE-Class in the information of the TE link as the reserved bandwidth.

* * * * *